United States Patent
Triller et al.

(10) Patent No.: US 7,470,204 B2
(45) Date of Patent: Dec. 30, 2008

(54) TRANSMISSION WITH BELT ELEMENTS, ESPECIALLY FOR THE TRANSMISSION OF FORCE BETWEEN TWO PAIRS OF CONICAL DISKS OF THE TRANSMISSION

(75) Inventors: Andreas Triller, Bühl (DE); André Teubert, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/498,725

(22) PCT Filed: Dec. 13, 2002

(86) PCT No.: PCT/DE02/04570

§ 371 (c)(1),
(2), (4) Date: Feb. 1, 2005

(87) PCT Pub. No.: WO03/052290

PCT Pub. Date: Jun. 26, 2003

(65) Prior Publication Data

US 2005/0119081 A1 Jun. 2, 2005

(30) Foreign Application Priority Data

Dec. 14, 2001 (DE) ................................. 101 61 503

(51) Int. Cl.
*F16G 1/26* (2006.01)

(52) U.S. Cl. ...................................... 474/201; 474/215

(58) Field of Classification Search ................. 474/201, 474/206, 214, 215
See application file for complete search history.

(56) References Cited

U.S. PATENT DOCUMENTS

| 3,353,421 | A | * | 11/1967 | Ketterle et al. | 474/215 |
| 3,916,709 | A | * | 11/1975 | Steuer et al. | 474/242 |
| 4,668,210 | A | * | 5/1987 | Honda | 474/242 |
| 5,427,583 | A | * | 6/1995 | Wolf | 474/206 |
| 5,562,557 | A | * | 10/1996 | Ledvina et al. | 474/84 |
| 5,728,021 | A | | 3/1998 | van Rooij et al. | 472/229 |
| 6,135,908 | A | * | 10/2000 | Greiter | 474/215 |
| 6,478,704 | B1 | * | 11/2002 | Greiter | 474/229 |

FOREIGN PATENT DOCUMENTS

| DE | 199 22 827 A1 | 11/1999 |
| EP | 0 741 255 A1 | 11/1996 |

* cited by examiner

*Primary Examiner*—Marcus Charles
*Assistant Examiner*—Terence Boes
(74) *Attorney, Agent, or Firm*—Alfred J. Mangels

(57) ABSTRACT

A transmission having a steplessly adjustable transmission ratio that includes an endless torque-transmitting element in the form of a plate-link chain. The chain is adapted to pass over and around two pairs of conical disks, and it includes a number of side-by-side plate links having openings for receiving pressure members that interconnect plate links and that have end faces that frictionally engage the conical disks. The plate links are arranged in transverse rows and in longitudinal rows. Each of the outermost lateral edges of the chain is defined by pairs of side-by-side plate links.

24 Claims, 4 Drawing Sheets

TRANSMISSION WITH BELT ELEMENTS, ESPECIALLY FOR THE TRANSMISSION OF FORCE BETWEEN TWO PAIRS OF CONICAL DISKS OF THE TRANSMISSION

BACKGROUND OF THE INVENTION

1. Field of the Invention

The invention relates to a transmission with a steplessly adjustable transmission ratio with an endless torque-transmitting means, particularly for transmitting power between two pairs of conical disks of the transmission.

2. Description of the Related Art

FIG. 1 shows a side view of an endless torque-transmitting means in the form of a chain, as is known from DE 199 22 827 A1. As shown in FIG. 1a, such a chain 30 is adapted to pass around and between two conical disk pairs 32, 34. The endless torque-transmitting means is assembled from plate links 10a, 10b several of which, not visible in FIG. 1, are arranged in longitudinal rows in the length direction of the endless torque-transmitting means. The plate links have openings 12 through which pressure members 12 grippingly extend by means of which the plate links are assembled and joined together in a longitudinal and transverse connection to form the endless torque-transmitting means. Opening 12 of each plate link is penetrated by two pressure members 14 that are supported on the forward and rear walls of the opening, whereby at least single ones of the plate links 10a, 10b that are in different longitudinal rows of plate links in the longitudinal direction of the endless torque-transmitting means are displaceably arranged in a longitudinal dimension of an opening less the pressure member diameter, so that a pressure member that extends transversely through the endless torque-transmitting means and projects therethrough is supported on one end side of the openings and another of the pressure members on the other end side, through which the transmission of longitudinal forces within the endless torque-transmitting means is made possible.

The end surfaces 16 on the sides of the pressure members are designed for frictional engagement with associated conical surfaces of conical disk pairs (not shown), between which the endless torque-transmitting means transmits forces or torques.

The pressure members 14 are in each case subdivided into two rocker members that roll against each other by chain articulation movements of the plate links and thereby minimize the friction on the plate links of the link structure. To connect the pressure members in a secure manner with the plate links 10, formations in the form of weld points are applied to the outer periphery of the pressure members 14.

An endless torque-transmitting means in accordance with FIG. 1 is generally constructed in such a way that the arrangement of the individual plate links that are aligned relative to each other in the transverse direction of the endless torque-transmitting means are periodically repeated in individual longitudinal rows, for example the second transverse row that is offset relative to the first transverse row is arranged differently than the third transverse row that is in turn offset relative to the second transverse row, to which, in turn, the first transverse row follows. One refers then to a three-link connection.

The arrangement of the individual plate links within the longitudinal rows and the transverse rows has a marked influence on the operating behavior of the endless torque-transmitting means, such as its endurance, its abrasion, and the like.

An object of the invention is to develop a generic transmission with an endless torque-transmitting means of such a type that the forces that appear within the plate links in the interconnection of the endless torque-transmitting means or plate-link chain, and therewith the stress on the plate links and on the pressure members, is as uniform as possible.

SUMMARY OF THE INVENTION

The object is achieved in that in accordance with the invention in each case in the outermost region of the chain two or more immediately adjacently arranged plate links carry the uniformly divided forces, especially in the highly-loaded outer marginal region of the endless torque-transmitting means, by means of the double plate links or paired plate links provided there. In the middle region of such an endless torque-transmitting means in accordance with the invention there can be provided in individual transverse rows only individual plate links.

Furthermore, it is advantageous that the endless torque-transmitting means in accordance with the invention, as is known, can be formed as a triple connection. It should be understood that also other connections are possible.

Moreover, in each case there can be arranged on the outside more than two plate links immediately next to each other.

It is furthermore advantageous, at a position inside the outermost aligned plate links that are immediately adjacently arranged, to arrange a large number of immediately adjacently arranged offset plate links.

The number of plate links that are seen in the transverse direction of the endless torque-transmitting means with their openings aligned relative to each other and arranged behind each other can be uniform, and that number can in other exemplary embodiments be different in the longitudinal direction of the endless torque-transmitting means.

Furthermore, the arrangement of the plate links relative to the longitudinal centerline of the endless torque-transmitting means can be symmetrical or unsymmetrical.

BRIEF DESCRIPTION OF THE DRAWINGS

The invention will be further explained below by examples and with further details on the basis of schematic drawings in which there is shown.

DESCRIPTION OF THE PREFERRED EMBODIMENTS

Figure 1:
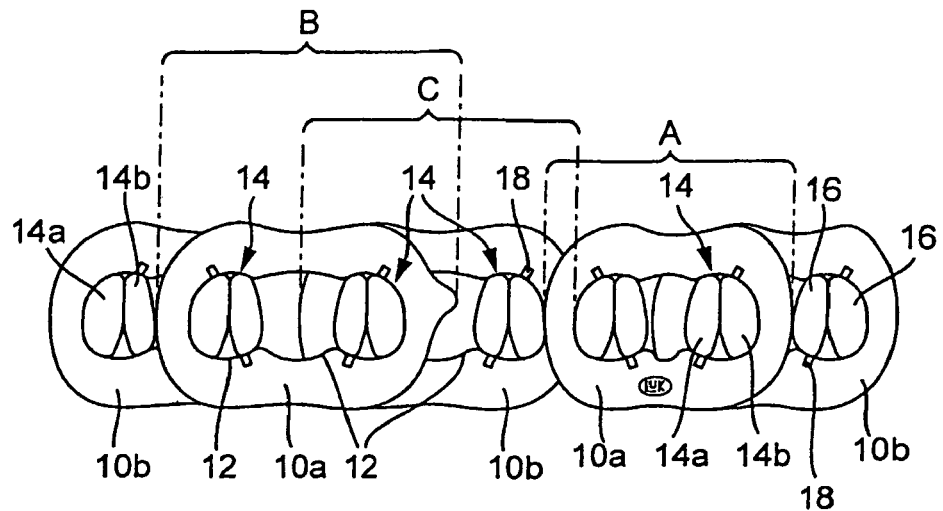
FIG. 1 a side view of an endless torque-transmitting means formed as a plate-link chain.
Figure 2:
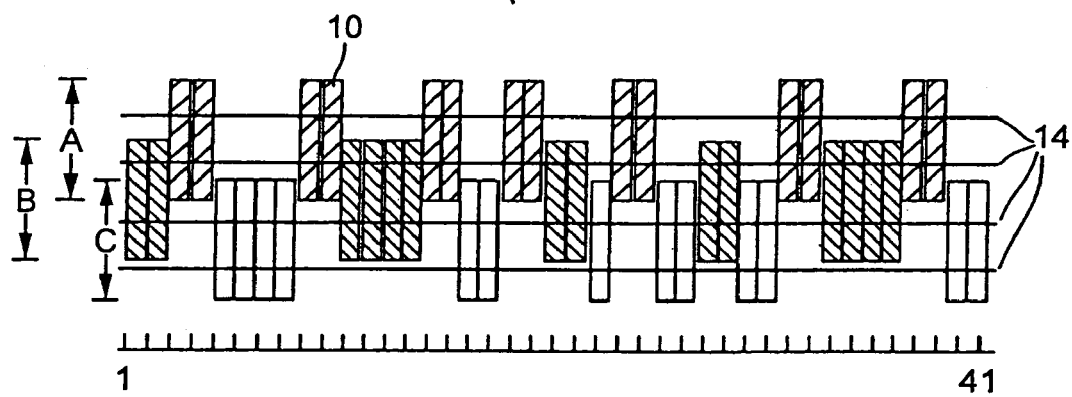

FIG. 2 shows a top view of a section of a plate-link chain whose plate links 10 are arranged in forty-one side-by-side, longitudinal rows extending in the longitudinal direction of the plate-link chain (vertical direction of the paper). The plate-link chain is assembled from three different transverse rows A, B, and C, within which in each case two pressure members 14 intervene to provide a connection between each two transverse rows. The transverse rows A, B, and C are each offset from each other in the longitudinal extent of the openings 12 (FIG. 1), less the diameters of the pressure members 14.

As can be seen from FIG. 2, the plate links in the different transverse rows in the transverse direction of the plate-link chain are arranged in such a way that viewed from left to right first of all two outermost plate links are arranged in transverse row B, then follow two plate links in transverse row A, then follow four plate links in transverse row C, then follow two plate links in transverse row A, then follow four plate links in transverse row B, then follow two plate links in transverse row A, two plate links in transverse row C, two plate links in transverse row A, two plate links in transverse row B, one plate link in transverse row C, two plate links in transverse row A, two plate links in transverse row C, two plate links in transverse row B, two plate links in transverse row C, two plate links in transverse row A, four plate links in transverse row B, two plate links in transverse row A, and two plate links in transverse row C. Transverse row A contains fourteen plate links, transverse row B likewise contains fourteen plate links, and transverse row C contains 13 plate links, that in the described way divide into longitudinal rows 1 to 41.

Figure 3:
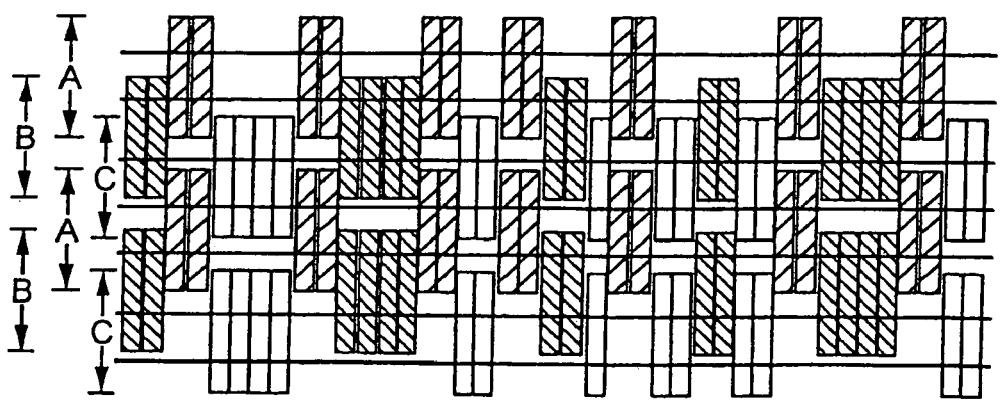
Figure 1A:
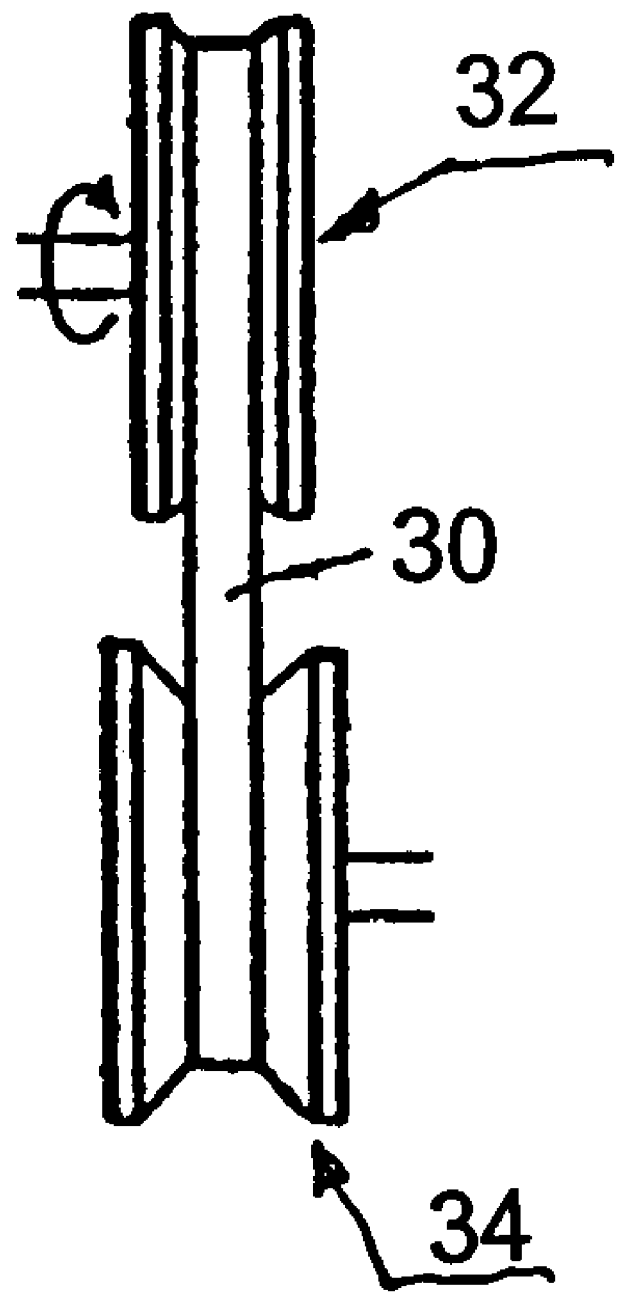
FIG. 1a is a schematic side view of two conical disk pairs and an endless torque-transmitting means that passes around and between the conical disk pairs, FIG. 2 a top view of a section of an endless torque-transmitting means, FIG. 3 two sections in accordance with FIG. 2 joined together, FIG. 4 a top view of a section of a plate-link chain that is modified relative to FIG. 2, FIG. 5 a top view of a section of a further embodiment of a plate-link chain, FIG. 6 a top view of a section of a further modified embodiment of a plate-link chain, FIG. 7 a top view of a section of a further modified embodiment of a plate-link chain, FIG. 8 a force curve across the width of a plate-link chain, FIGS. 9 and 10 a top view of a section of two further modified embodiments of a plate-link chain.

FIG. 3 shows two sections of FIG. 2 placed together to show that the pattern of FIG. 2 is in each case repeated.

Whereas in FIG. 1, which shows a side view of a known plate-link chain, from the outside the outermost plate links of all three transverse rows are visible, in the plate-link chain with an interconnection in accordance with FIG. 2 from the left only the outermost plate links of transverse rows B and A are visible.

Figure 4:
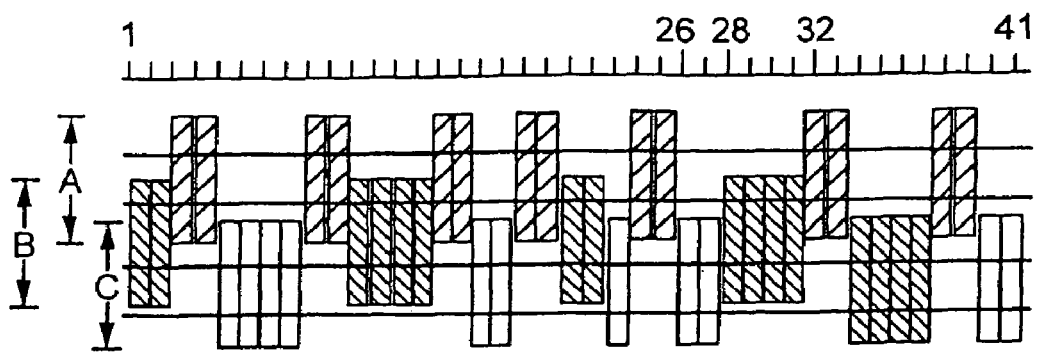

FIG. 4 shows an arrangement of plate links of a plate-link chain that is different from the arrangement in accordance with FIG. 2, in that the longitudinal rows 28 to 37 are filled differently.

Figure 5:
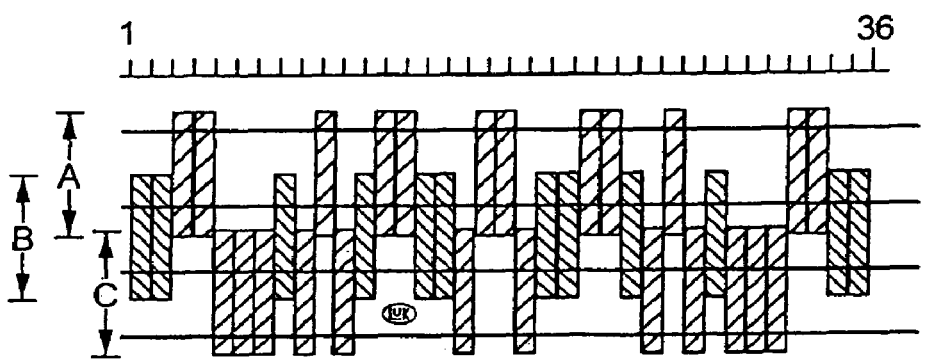
Figure 6:
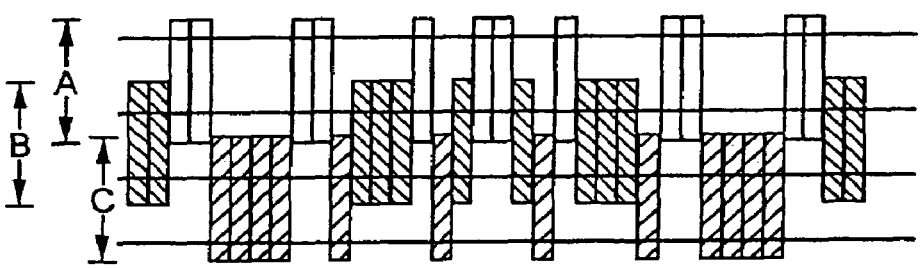
Figure 7:
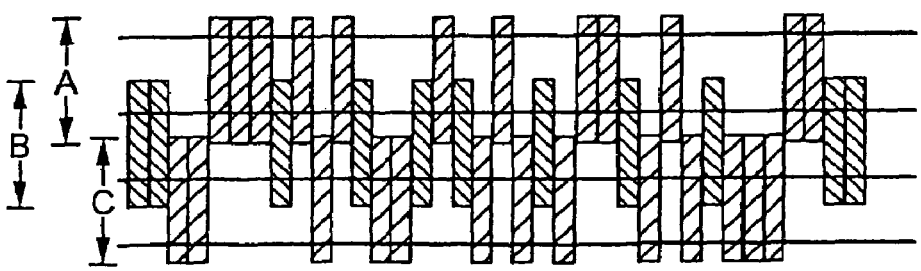

FIGS. 5 to 7 show views of sections of a plate-link chain that are composed of only 36 longitudinal rows. On the other hand, the outermost plate links are each arranged in side-by-side immediate pairs, whereby those plate links are in each case arranged in transverse row B. The pattern of FIGS. 5 and 6 is symmetrically related on the longitudinal centerline, wherein in each transverse row twelve plate links are arranged.

The embodiment of the plate-link chain in accordance with FIG. 7 is unsymmetrical relative to the longitudinal central plane of the plate-link chain, wherein there are twelve plate links arranged in transverse row A, eleven plate links in transverse row B, and thirteen plate links in transverse row C.

As is immediately apparent from the figures, the illustrated embodiments of plate-link chains in accordance with the invention are common in that each of the outermost plate links (in transverse rows B and C in accordance with FIGS. 2 and 4) and in the transverse row B in accordance with FIG. 5 to 7 are in each case arranged in pairs immediately next to each other. In the interior there follows in each case a further plate-link pair, as to which further to the inside in a transverse row a number greater than two immediately adjacently arranged plate links are connected.

Figure 8:
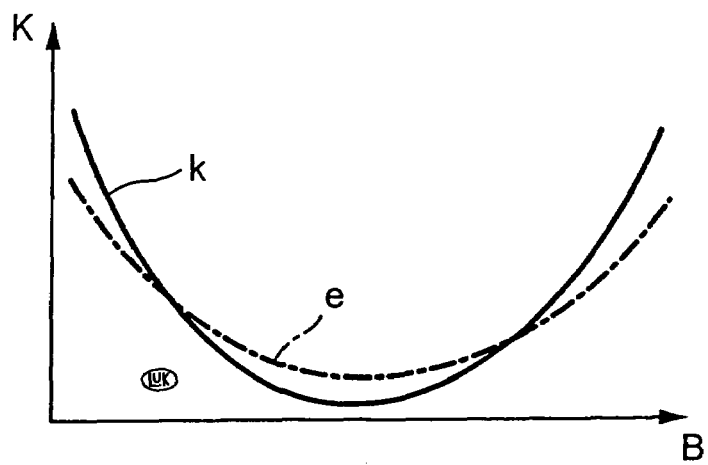

FIG. 8 shows the operating plate-link loads K within the plate-link chain as a function of the width position B in the plate-link chain. The continuous curve k shows the load distribution in conventional plate-link chains. The dashed curve e shows the load distribution in plate-link chains in accordance with the invention. As can be seen, the differences between the operating loads in the outer regions relative to the loads in the inner region of the plate-link chain are clearly diminished by the arrangement of the plate links in accordance with the invention.

Figure 9:
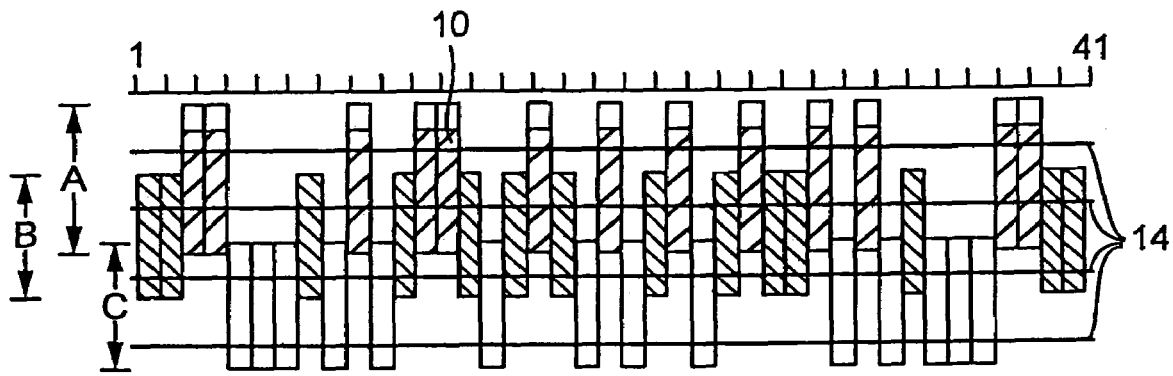

FIG. 9 shows a top view of a section of a plate-link chain whose plate links 10 are arranged in 41 side-by-side-arranged longitudinal rows in the longitudinal direction of the plate-link chain (vertical paper direction). The plate-link chain is assembled from three different transverse rows, within which in each case two pressure members 14 establish a connection between each two transverse rows. Transverse rows A, B, and C are in each case offset relative to each other in the longitudinal extent of openings 12 (FIG. 1 ) less the diameter of pressure members 14.

As can be seen from FIG. 9 in the transverse direction of the plate-link chain the arrangement of the plate links in the different transverse rows is such that viewed from left to right first of all two outermost plate links are in transverse row B, then follow two plate links in transverse row A, then follow three plate links in transverse row C. Then follows a plate link in each of transverse rows B, C, A, C, B. Thereafter follow two plate links of row A. There furthermore follows a single plate link connection of rows B, C, B, A, B. C. and A, wherein those plate links represent the middle links of the plate link connection, not, however, an axis of symmetry. Thereon follows a further single plate link connection of rows C, B, A, C, B, A after which a double-link connection of row B follows. Then there is connected a further single plate link connection of rows A, C, A, C, B. After that follow three plate links of row C, two plate links of row A, and at the edge two plate links of row B. In that unsymmetrical plate-link connection in each case only the outermost plate links are symmetrically arranged.

Figure 10:
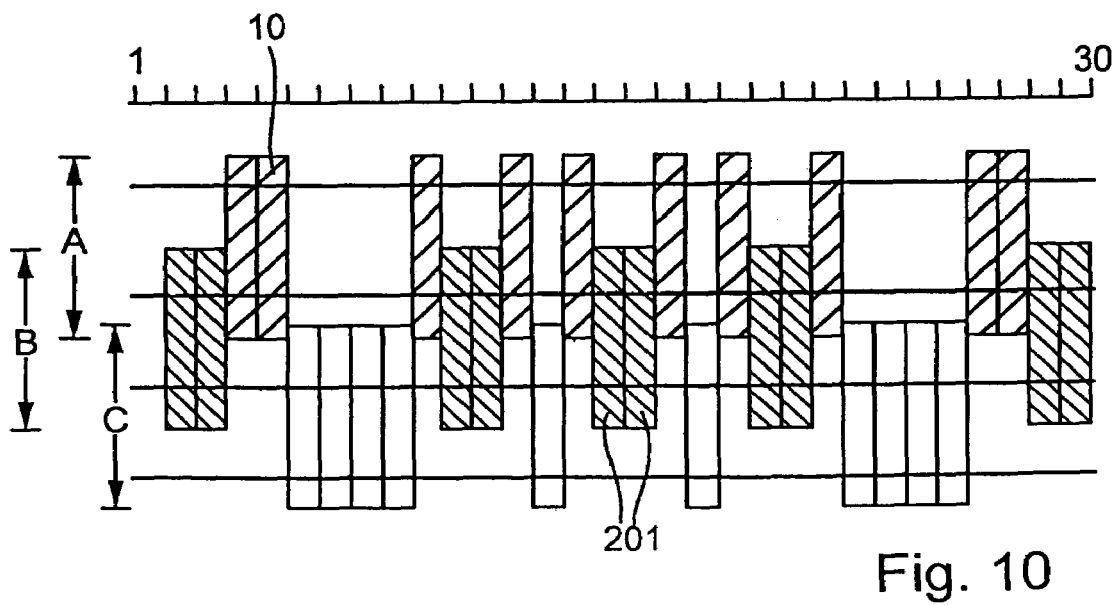

FIG. 10 shows a symmetrical plate link connection with thirty rows of plate links linked together in rows A, B, C in the transverse direction. Both plate links 201 arranged in row B thereby form the plane of symmetry, from there outward the plate links are arranged as follows to edge position 1 or 30: plate link 201 followed by individual plate links in rows A, C, A, two plate links in row B, a single plate link in row A, four plate links in row C, two plate links in row A, and two plate links in row B.

The claims that are filed in the application are formulation proposals without prejudice for the obtaining of broader patent protection. The applicant reserves the right to claim still further combinations of features that, at this time, are disclosed only in the specification and/or in the drawings.

The references made in dependent claims point out further developments of the matter of the main claim through the features of the respective dependent claims; they are not to be understood to constitute a waiver of the achievement of an independent objective protection for the combinations of features of dependent claims that refer to preceding claims.

Since the features of dependent claims, as far as the state of the prior art on the priority date is concerned, can constitute separate and independent inventions, applicant reserves the right to recite the subject matter of such dependent claims in independent claims or in divisional applications. Furthermore, such dependent claims can recite independent inventions embodying structure other than that in the parent dependent claims.

The exemplary embodiments should not be interpreted as a limitation of the invention. On the contrary, within the scope of the present disclosure numerous changes and modifications are possible, especially such modifications, elements and combinations and/or materials that, for example, as a result of combinations or modifications of individual features or elements or method steps contained in the general description, in the descriptions of various embodiments, and in the claims, and illustrated in the drawing, can be comprehended by persons skilled in the art as far as the achievement of the object is concerned and, as a result of combinable features, lead to a novel device or to novel method steps and/or sequences of method steps, also as far as the manufacture, testing and mode of operation are concerned.

What is claimed is:

1. A transmission having a steplessly adjustable transmission ratio, said transmission comprising: two pairs of axially spaced conical disks, an endless torque-transmitting means for transmitting power between the pairs of conical disks and including a plurality of side-by-side plate links having openings and arranged in several rows extending in the longitudinal direction of the endless torque-transmitting means for transmitting longitudinal forces, a plurality of pressure members that extend through respective ones of the plate-link openings of laterally adjacent plate links, the pressure members having respective outermost ends in frictional engagement with conical surfaces of the conical disk pairs as the endless torque-transmitting means transmits power between the pairs of conical disks, wherein two pressure members that are adjacent to each other in the longitudinal direction of the endless torque-transmitting means extend through openings in side-by-side plate links, wherein the arrangement in longitudinal rows in the longitudinal direction of the endless torque-transmitting means of the plate links through which the pressure members extend that are adjacent to each other is repeated in each case after a predetermined number of adjacent pressure members, wherein pairs of side-by-side plate links are provided in first longitudinal rows that are inward of and adjacent to pairs of side-by-side plate links in outermost longitudinal rows of plate links and are penetrated by at least one pair of the same side-by-side pressure members, and wherein each of two laterally outermost longitudinal rows of plates include pairs of side-by-side planar plates that are coextensive with each other to define outermost plate pairs for more uniform distribution of longitudinal stresses across a transverse direction of the endless torque-transmitting means.

2. A transmission according to claim 1, wherein an arrangement pattern of plate links is repeated along the longitudinal rows after each of the adjacent pressure members.

3. A transmission according to claim 1, wherein additional plate links are inward of and immediately adjacent plate links of the first longitudinal rows of plates.

4. A transmission according to claim 1, wherein inward of the outermost pairs of side-by-side plate links additional groups of side-by-side plate links are longitudinally offset from the outermost pairs of side-by-side plate links and are arranged in repeated longitudinally aligned groups.

5. A transmission according to claim 1, wherein the number of plate links in respective transverse rows of the endless torque-transmitting means is the same.

6. A transmission according to claim 1, wherein the number of plate links in a first transverse group of plate links, having their openings aligned relative to each other to receive at least a first pair of pressure members, is different from the number of plate links in a second transverse group of plate links, having their openings aligned relative to each other to receive at least a second pair of pressure members, wherein the first and second groups of plate links are arranged in the longitudinal direction of the endless torque-transmitting means.

7. A transmission according to claim 1, wherein the arrangement of the plate links relative to the longitudinal centerline of the endless torque-transmitting means is symmetrical.

8. A transmission according to claim 1, wherein the arrangement of the plate links relative to the longitudinal centerline of the endless torque-transmitting means is unsymmetrical.

9. A transmission according to claim 2, wherein the endless torque-transmitting means includes 41 longitudinal rows arranged side-by-side and the association of the plate links to the rows R is:

| R | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| a |   |   | x | x |   |   |   |   | x | x  |    |    |    |    | x  | x  |    |    | x  | x  |    |
| b | x | x |   |   |   |   |   |   |   |    |    | x  | X  | x  | x  |    |    |    |    |    | x  |
| c |   |   |   |   |   | x | x | x | x |    |    |    |    |    |    |    | x  | x  |    |    |    |

| R | 22 | 23 | 24 | 25 | 26 | 27 | 28 | 29 | 30 | 31 | 32 | 33 | 34 | 35 | 36 | 37 | 38 | 39 | 40 | 41 |
|---|----|----|----|----|----|----|----|----|----|----|----|----|----|----|----|----|----|----|----|----|
| a |    |    | x  | x  |    |    |    |    |    |    | X  | x  |    |    |    | x  | x  |    |    |    |
| b | x  |    |    |    |    |    | x  | x  |    |    |    |    | x  | x  | x  | x  |    |    |    |    |
| c |    | x  |    |    |    | x  | x  |    | x  | x  |    |    |    |    |    |    |    |    | x  | x  | wherein a is the relation to the longitudinal rows of a first transverse row of plate links with their openings arranged aligned relative to each other, b is the relation to the longitudinal rows of a second transverse row offset relative to the first transverse row in the longitudinal direction of the endless torque-transmitting means because of the spacing of adjacent pressure members and c is the relation to the longitudinal rows of a third transverse row offset relative to the second transverse row in the longitudinal direction of the endless torque-transmitting means because of the spacing of adjacent pressure members.

10. A transmission according to claim 2, wherein the endless torque-transmitting means includes 41 adjacently-arranged rows R and the association of the plate links to the rows is as follows:

| R | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| a |   |   | x | x |   |   |   |   | x | x  |    |    |    |    | x  | x  |    |    | x  | x  |    |
| b | x | x |   |   |   |   |   |   |   | x  | X  | x  | x  |    |    |    |    |    |    |    | x  |
| c |   |   |   |   |   | x | x | x | x |    |    |    |    |    |    |    | x  | x  |    |    |    |

| R | 22 | 23 | 24 | 25 | 26 | 27 | 28 | 29 | 30 | 31 | 32 | 33 | 34 | 35 | 36 | 37 | 38 | 39 | 40 | 41 |
|---|----|----|----|----|----|----|----|----|----|----|----|----|----|----|----|----|----|----|----|----|
| a |    |    | x  | x  |    |    |    |    |    |    | X  | x  |    |    |    |    | x  | x  |    |    |
| b | x  |    |    |    |    |    |    |    |    |    |    |    | x  | x  | x  | x  |    |    |    |    |
| c |    | x  |    |    | x  | x  |    |    |    | x  | x  |    |    |    |    |    |    |    | x  | x  | wherein a is the relation to the longitudinal rows of a first transverse row of plate links with their openings arranged aligned relative to each other, b is the relation to the longitudinal rows of a second transverse row offset relative to the first transverse row in the longitudinal direction of the endless torque-transmitting means because of the spacing of adjacent pressure members and c is the relation to the longitudinal rows of a third transverse row offset relative to the second transverse row in the longitudinal direction of the endless torque-transmitting means because of the spacing of adjacent pressure members in the longitudinal direction of the endless torque-transmitting means.

11. A transmission according to claim 2, wherein the endless torque-transmitting means includes 36 adjacently-arranged rows R and the association of the plate links to the rows is as follows:

| R | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| a |   |   | x | x |   |   |   |   |   | x  |    |    | x  | x  |    |    |    | x  | x  |    |    |
| b | x | x |   |   |   |   |   | x |   |    |    | X  |    |    | x  | x  |    |    |    |    | x  |
| c |   |   |   |   |   | x | x | x |   | x  |    |    |    |    |    |    | x  |    |    | x  |    |

| R | 22 | 23 | 24 | 25 | 26 | 27 | 28 | 29 | 30 | 31 | 32 | 33 | 34 | 35 | 36 |
|---|----|----|----|----|----|----|----|----|----|----|----|----|----|----|----|
| a |    | x  | x  |    |    |    | x  |    |    |    |    | x  | x  |    |    |
| b | x  |    |    |    | x  |    |    |    | x  |    |    |    |    | x  | x  |
| c |    |    |    |    | x  |    | x  |    |    | x  | x  | X  |    |    |    | wherein a is the relation to the longitudinal rows of a first transverse row of plate links with their openings arranged aligned relative to each other, b is the relation to the longitudinal rows of a second transverse row offset relative to the first transverse row in the longitudinal direction of the endless torque-transmitting means because of the spacing of adjacent pressure members and c is the relation to the longitudinal rows of a third transverse row offset relative to the second transverse row in the longitudinal direction of the endless torque-transmitting means because of the spacing of adjacent pressure members in the longitudinal direction of the endless torque-transmitting means.

12. A transmission according to claim 2, wherein the endless torque-transmitting means includes 36 adjacently-arranged rows R and the association of the plate links to the rows is as follows:

| R | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| a |   |   | x | x |   |   |   |   | x | x  |    |    | X  | x  |    | x  |    | x  | x  |    |    |
| b | x | x |   |   |   |   |   |   |   |    |    | X  | x  | x  |    |    | x  |    |    | x  |    |
| c |   |   |   |   |   | x | x | x | x |    |    | x  |    |    |    | x  |    |    |    |    | x  |

| R | 22 | 23 | 24 | 25 | 26 | 27 | 28 | 29 | 30 | 31 | 32 | 33 | 34 | 35 | 36 |
|---|----|----|----|----|----|----|----|----|----|----|----|----|----|----|----|
| a | x  |    |    |    |    |    | x  | x  |    |    |    |    | x  | x  |    |
| b |    | x  | x  | x  |    |    |    |    |    |    |    |    |    | x  | x  |
| c |    |    |    |    | x  |    |    | x  | x  | x  | X  |    |    |    |    | wherein a is the relation to the longitudinal rows of a first transverse row of plate links with their openings arranged aligned relative to each other, b is the relation to the longitudinal rows of a second transverse row offset relative to the first transverse row in the longitudinal direction of the endless torque-transmitting means because of the spacing of adjacent pressure members and c is the relation to the longitudinal rows of a third transverse row offset relative to the second transverse row in the longitudinal direction of the endless torque-transmitting means because of the spacing of adjacent pressure members in the longitudinal direction of the endless torque-transmitting means.

13. A transmission according to claim 2, wherein the endless torque-transmitting means includes 36 adjacently-arranged rows R and the association of the plate links to the rows is as follows:

| R | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| a |   |   |   |   | x | x | x |   | x |    | x  |    |    |    |    | x  |    |    | x  |    |    |
| b | x | x |   |   |   |   |   | x |   |    |    |    | X  |    | x  |    | x  |    |    |    | x  |
| c |   |   | x | x |   |   |   |   |   | x  |    |    |    | x  | x  |    |    |    | x  |    | x  |

| R | 22 | 23 | 24 | 25 | 26 | 27 | 28 | 29 | 30 | 31 | 32 | 33 | 34 | 35 | 36 |
|---|----|----|----|----|----|----|----|----|----|----|----|----|----|----|----|
| a |    | x  | x  |    |    |    | x  |    |    |    |    |    | x  | x  |    |
| b |    |    |    | x  |    |    |    | x  |    |    |    |    |    | x  | x  |
| c | x  |    |    |    | x  |    | x  |    | x  | x  | X  |    |    |    |    | wherein a is the relation to the longitudinal rows of a first transverse row of plate links with their openings arranged aligned relative to each other, b is the relation to the longitudinal rows of a second transverse row offset relative to the first transverse row in the longitudinal direction of the endless torque-transmitting means because of the spacing of adjacent pressure members and c is the relation to the longitudinal rows of a third transverse row offset relative to the second transverse row in the longitudinal direction of the endless torque-transmitting means because of the spacing of adjacent pressure members.

14. A transmission according to claim 2, wherein the endless torque-transmitting means includes 41 adjacently-arranged rows R and the association of the plate links to the rows is as follows:

| R | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| a |   |   | x | x |   |   |   |   | x |    |    |    | x  | x  |    |    |    | x  |    |    | x  |
| b | x | x |   |   |   |   | x |   |   |    | x  |    |    |    | x  |    | x  |    | x  |    |    |
| c |   |   |   |   | x | x | x |   |   |    |    | x  |    |    |    | x  |    |    |    | x  |    |

| R | 22 | 23 | 24 | 25 | 26 | 27 | 28 | 29 | 30 | 31 | 32 | 33 | 34 | 35 | 36 | 37 | 38 | 39 | 40 | 41 |
|---|----|----|----|----|----|----|----|----|----|----|----|----|----|----|----|----|----|----|----|----|
| a |    |    | x  |    |    | x  |    |    | x  |    |    | x  |    |    |    |    | x  | x  |    |    |
| b |    | x  |    |    | x  |    | x  | x  |    |    |    |    | x  |    |    |    |    |    | x  | x  |
| c | x  |    |    | x  |    |    |    |    |    |    | x  |    |    | x  | x  | x  |    |    |    |    | wherein a is the relation to the longitudinal rows of a first transverse row of plate links with their openings arranged aligned relative to each other, b is the relation to the longitudinal rows of a second transverse row offset relative to the first transverse row in the longitudinal direction of the endless torque-transmitting means because of the spacing of adjacent pressure members and c is the relation to the longitudinal rows of a third transverse row offset relative to the second transverse row in the longitudinal direction of the endless torque-transmitting means because of the spacing of adjacent pressure members in the longitudinal direction of the endless torque-transmitting means.

15. A transmission according to claim 2, wherein the endless torque-transmitting means includes 30 adjacently-arranged rows R and the association of the plate links to the rows is as follows:

| R | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| a |   |   | x | x |   |   |   |   | x |    |    | x  |    | x  |    |    | x  |    | x  |    |    |
| b | x | x |   |   |   |   |   |   |   | x  | x  |    |    |    | x  | x  |    |    |    | x  | x  |
| c |   |   |   |   | x | x | x | x |   |    |    |    | x  |    |    |    |    | x  |    |    |    |

| R | 22 | 23 | 24 | 25 | 26 | 27 | 28 | 29 | 30 |
|---|----|----|----|----|----|----|----|----|----|
| a | x  |    |    |    | x  | x  |    |    |    |
| b |    |    |    |    |    |    | x  | x  |    |
| c |    | x  | x  | x  |    |    |    |    | x  | wherein a is the relation to the longitudinal rows of a first transverse row of plate links with their openings arranged aligned relative to each other, b is the relation to the longitudinal rows of a second transverse row offset relative to the first transverse row in the longitudinal direction of the endless torque-transmitting means because of the spacing of adjacent pressure members and c is the relation to the longitudinal rows of a third transverse row offset relative to the second transverse row in the longitudinal direction of the endless torque-transmitting means because of the spacing of adjacent pressure members in the longitudinal direction of the endless torque-transmitting means.

16. A transmission having a steplessly adjustable transmission ratio, said transmission comprising: two pairs of axially spaced conical disks; an endless torque-transmitting means for transmitting torque between the pairs of conical disks and including a plurality of plates having openings and extending in a plurality of transverse rows across the endless torque-transmitting means, and extending in a plurality of longitudinal rows along a longitudinal direction of the endless torque-transmitting means for transmitting longitudinal forces, wherein the plates in the longitudinal and transverse rows are parallel to each other and the plates in the transverse rows are in side-by-side contact on each side thereof with adjacent transversely arranged plates; a plurality of pressure members that extend through the plate openings and having respective outermost ends in frictional engagement with conical surfaces of the conical disks as the endless torque-transmitting means transmits torque between the conical disk pairs; wherein longitudinal forces at each outermost lateral side of the endless torque-transmitting means are transmitted by two outermost longitudinal rows of plates at each lateral side of the endless torque-transmitting means, wherein each of the two outermost longitudinal rows of plates include pairs of side-by-side planar plates that are coextensive with each other to define outermost plate pairs for more uniform distribution of longitudinal stresses across a transverse direction of the endless torque-transmitting means; and wherein inner regions of the endless torque-transmitting means include individual plates that are longitudinally offset from adjacent plates.

17. A transmission according to claim 16, wherein two longitudinal rows of plates that are inward of and adjacent to each of the two outermost longitudinal rows of plates include pairs of side-by-side planar plates that are coextensive with each other and are longitudinally offset from the pairs of plates of the two outermost longitudinal rows.

18. A transmission according to claim 16, wherein a transverse arrangement pattern of the plates in a transverse row is repeated along the longitudinal direction of the endless torque-transmitting means.

19. A transmission according to claim 16, wherein the endless torque-transmitting means includes 41 longitudinal rows arranged side-by-side and the association of the plates to the rows R is:

| R | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| a |   |   | x | x |   |   |   |   | x | x |   |   |   |   | x | x |   |   | x | x |   |
| b | x | x |   |   |   |   |   |   |   |   | x | X | x | x |   |   |   |   |   |   | x |
| c |   |   |   |   | x | x | x | x |   |   |   |   |   |   |   |   | x | x |   |   |   |

| R | 22 | 23 | 24 | 25 | 26 | 27 | 28 | 29 | 30 | 31 | 32 | 33 | 34 | 35 | 36 | 37 | 38 | 39 | 40 | 41 |
|---|---|---|---|---|---|---|---|---|---|---|---|---|---|---|---|---|---|---|---|---|
| a |    |    | x  | x  |    |    |    |    |    |    | X  | x  |    |    |    |    | x  | x  |    |    |
| b | x  |    |    |    |    |    | x  | x  |    |    |    |    | x  | x  | x  | x  |    |    |    |    |
| c |    | x  |    |    | x  | x  |    |    | x  | x  |    |    |    |    |    |    |    |    | x  | x  | wherein a is the relation to the longitudinal rows of a first transverse row of plates with their openings arranged aligned relative to each other, b is the relation to the longitudinal rows of a second transverse row offset relative to the first transverse row in the longitudinal direction of the endless torque-transmitting means because of the spacing of adjacent pressure members, and c is the relation to the longitudinal rows of a third transverse row offset relative to the second transverse row in the longitudinal direction of the endless torque-transmitting means because of the spacing of adjacent pressure members.

20. A transmission according to claim 16, wherein the number of plates in a first transverse group of plates, having their openings aligned relative to each other to receive at least a first pair of pressure members, is different from the number of plates in a second, adjacent transverse group of plates, having their openings aligned relative to each other to receive at least a second pair of pressure members, wherein the first and second groups of plates are arranged in the longitudinal direction of the endless torque-transmitting means.

21. A transmission according to claim 16, wherein the arrangement of the plates relative to the longitudinal centerline of the endless torque-transmitting means is unsymmetrical.

22. A transmission according to claim 16, wherein the plates have unitary openings that each receive two pairs of side-by-side, contacting pressure members.

23. A transmission according to claim 16, wherein the plates of each of the outermost longitudinal rows of plates are of equal shape.

24. A transmission according to claim 16, wherein each plate in a transverse row of plates inward of the two outermost longitudinal rows of plates is in side-to-side contact on each side thereof with at least part of an adjacent plate.

\* \* \* \* \*